(12) United States Patent
Albert

(10) Patent No.: US 12,553,501 B2
(45) Date of Patent: Feb. 17, 2026

(54) HYDROSTATIC ROTATING MACHINE WITH RADIAL PISTONS AND WITH IMPROVED DISTRIBUTION

(71) Applicant: Robert Bosch GmbH, Stuttgart (DE)

(72) Inventor: Laurent Eugène Albert, Frignicourt (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/817,962

(22) Filed: Aug. 28, 2024

(65) Prior Publication Data
US 2025/0137517 A1    May 1, 2025

(30) Foreign Application Priority Data

Oct. 31, 2023   (FR) .................................. FR2311903

(51) Int. Cl.
*F16H 41/22*   (2006.01)
*F16H 39/40*   (2006.01)

(52) U.S. Cl.
CPC ............. *F16H 41/22* (2013.01); *F16H 39/40* (2013.01)

(58) Field of Classification Search
CPC .......... F16H 41/22; F16H 39/40; F03C 1/047; F03C 1/0441; F04B 1/047
See application file for complete search history.

(56) References Cited

U.S. PATENT DOCUMENTS

| | | | |
|---|---|---|---|
| 2021/0285429 A1* | 9/2021 | Albert | .................... F01B 13/06 |
| 2025/0163978 A1* | 5/2025 | Albert | .................... F16D 55/38 |

FOREIGN PATENT DOCUMENTS

WO    2020/008145 A1    1/2020

* cited by examiner

*Primary Examiner* — Terence Boes
(74) *Attorney, Agent, or Firm* — Maginot, Moore & Beck LLP

(57) ABSTRACT

A hydrostatic rotating machine includes an internal element and an external element that revolve with respect to one another about an axis of rotation, a cylinder block, and a hydraulic distributor. The hydraulic distributor includes an insertion section extending axially between a section of lesser diameter and a section of greater diameter, with a first synchronization surface, and fluid distribution ducts which each have an end segment opening transversely at the first synchronization surface, and obliquely with respect to the axis of rotation. The cylinder block includes a reception section complementing the insertion section of the hydraulic distributor, and fluid diffusion ducts which each have an end segment opening transversely at the second synchronization surface, and obliquely with respect to the axis of rotation.

20 Claims, 6 Drawing Sheets

HYDROSTATIC ROTATING MACHINE WITH RADIAL PISTONS AND WITH IMPROVED DISTRIBUTION

This application claims priority under 35 U.S.C. § 119 to application no. FR 2311903, filed on Oct. 31, 2023 in France, the disclosure of which is incorporated herein by reference in its entirety.

FIELD

The disclosure relates to the field of mechanics and hydraulics and relates more particularly to a hydrostatic rotating machine.

The hydrostatic rotating machines are revolving machines comprising a stator coupled with a rotor which is generally linked to a revolving driving element such as a wheel, a pinion, or any transmission device.

Such a hydrostatic machine can be employed as a hydraulic motor. It is then powered by a hydraulic fluid under pressure and in response drives the revolving driving element.

The hydrostatic machine can also be employed as a hydraulic pump. It then receives a torque transmitted by the revolving driving element and in response compresses the hydraulic fluid.

BACKGROUND

The patent application WO 2020/008145 describes a hydrostatic rotating machine comprising:
 - an internal element and an external element that are coaxial and mounted to revolve with respect to one another about an axis of rotation, one of these elements being a rotor and the other of these elements being a stator, the external element comprising a circumferential internal cam path, the internal element comprising a cylinder block having radial cylinders provided with pistons that are radially mobile and distributed circumferentially, the cylinder block being disposed at the centre of the cam path, the pistons being adapted to cooperate with the cam path in the rotation of the rotor with respect to the stator; and
 - a hydraulic distributor adapted to selectively couple the cylinders to a hydraulic circuit, using a synchronization junction forming a revolving coupling between the rotor and the stator.

Although this hydrostatic machine offers advantages on a number of levels, it can be further enhanced with regard to the improving its dimensioning and its compactness.

SUMMARY

The hydrostatic machine enhances the hydrostatic rotating machines of the prior art.

To this end, the invention targets a hydrostatic rotating machine comprising:
 - an internal element and an external element that are coaxial and mounted to revolve with respect to one another about an axis of rotation, one of these elements being a rotor and the other of these elements being a stator, the external element comprising a circumferential internal cam path, the internal element comprising a cylinder block having radial cylinders provided with pistons that are radially mobile and distributed circumferentially, the cylinder block being disposed at the centre of the cam path, the pistons being adapted to cooperate with the cam path in the rotation of the rotor with respect to the stator;
 - a hydraulic distributor adapted to selectively couple the cylinders to a hydraulic circuit, using a synchronization junction forming a revolving coupling between the rotor and the stator.

Furthermore, the hydraulic distributor comprises:
 an insertion section extending axially between a section of lesser diameter and a section of greater diameter, this insertion section having a first synchronization surface extending between the outline of the section of lesser diameter and the outline of the section of greater diameter;
 fluid distribution ducts which each comprise an end segment opening transversely at the first synchronization surface, and obliquely with respect to the axis of rotation.

Furthermore, the cylinder block comprises:
 a reception section complementing the insertion section of the hydraulic distributor, this reception section having a second synchronization surface complementing the first synchronization surface of the hydraulic distributor, said synchronization junction being formed by the association of the first synchronization surface and of the second synchronization surface;
 fluid diffusion ducts which each comprise an end segment opening transversely at the second synchronization surface, and obliquely with respect to the axis of rotation.

According to the disclosure, the hydrostatic machine simultaneously offers a saving in compactness and an optimization of its dimensioning.

The coupling of the insertion section of the hydraulic distributor and of the reception section of the cylinder block, at the synchronization junction, makes it possible to ensure the fluid distribution function for the hydrostatic machine, consisting in cyclically setting each cylinder to correspond with the high-pressure or low-pressure side of the fluid circuit. This distribution function is here performed with forces produced by the hydraulic fluid, and which are exerted at the synchronization junction. These forces are oriented obliquely, by virtue of the characteristics of the synchronization surfaces and of the corresponding ducts, and thus have an axial component and a radial component. Given the disposition of the hydrostatic rotating machine with its radial pistons, the radial components of these forces are exerted and are compensated only at the cylinder block, without transmission of this component to other elements. Thus, a part of the force generated by the pressure of the hydraulic fluid and necessary for the transmission of energy is not applied to the rolling bearings coupling the rotor and the stator, but is applied instead to an element which can be made of a single piece, and the dimensioning of which can be easily planned to withstand these strains within its material.

For example, for a hydraulic motor working under a pressure of the order of 400 bar, the force generated at a distribution duct, at the moment when it is cyclically blocked by the second synchronization surface, is of the order of 35 kN. In the case of a distribution duct creating a force at 45° with respect to the axis of rotation, the axial component of this force represents approximately ⅔ of the total force, and it is this force which is applied axially to other elements, and notably to the rolling bearings which are provided to support the efforts, as a function of the mounting of rolling bearings provided for the rotating link of the rotor and of the stator about the axis of rotation. In this illustrative example, a reduction of the force being applied to these rolling bearings of the order of 10 kN is obtained. On most rolling bearing mountings, just one of the rolling bearings supports most of this axial force, and such a reduction of 10 kN is very consequential.

The first consequence of the invention impacts the dimensioning of the rolling bearings which can thus be dimensioned compactly, and can be selected from among a wider choice of technologies, while keeping the same performance levels for the hydrostatic machine, with a consequential reduction of the cost and the bulk of the rolling bearings and therefore of the hydrostatic machine overall, at the point where the prior art generally imposes bulky and expensive roller bearings according to complex mountings, suited to strong axial loads.

The general, and notably axial, bulk of the hydraulic distributor is also reduced inasmuch as the axial reduction of the forces linked to the pressure of the fluid also makes it possible to reduce the force that the hydraulic distributor has to exert against the cylinder block in order to keep integral the synchronization junction ("cylinder" function of the hydraulic distributor). The hydraulic distributor can thus be also dimensioned more compactly and more simply.

The second consequence of the invention relates to the simplification of the dimension chains by virtue of the arrangement of the synchronization junction, also allowing for a saving in compactness and a gain in reliability.

The saving in compactness is additionally reinforced in the axial dimension by the fact that sections of the hydraulic distributor and of the cylinder block are axially embedded.

The arrangement of the synchronization junction moreover makes it possible to implement ball joint functions between the internal element and the external element.

The invention thus makes it possible to either optimize the dimensioning of several constituent parts, and therefore save in compactness and in cost over all of the hydrostatic machine, or to overdimension the machine, with constant compactness and cost, and thus intend it for other applications, for example applications that are heavier, at greater speed, or that require a greater lifetime. A simplification of the construction, permitted by the arrangement of the synchronization junction, further allows for gains in reliability and in maintainability.

The invention also allows for manufacturing methods that are simpler and that allow a further reduction of the manufacturing cost.

The hydrostatic rotating machine according to the invention can comprise the following additional features, alone or in combination:

the end segments of the distribution ducts form an angle that lies substantially between 20° and 60°, and is preferentially substantially equal to 45°, with respect to the axis of rotation;

the end segments of the diffusion ducts form an angle that lies substantially between 20° and 60°, and is preferentially substantially equal to 45°, with respect to the axis of rotation;

the distribution ducts each open through a distribution orifice on the first synchronization surface, the normal to each distribution orifice forming an angle that lies substantially between 20° and 60°, and is preferentially substantially equal to 45°, with respect to the axis of rotation R; and the diffusion ducts each open through diffusion orifices on the second synchronization surface, the normal to each diffusion orifice forming an angle that lies substantially between 20° and 60°, and is preferentially substantially equal to 45°, with respect to the axis of rotation;

the angle formed by the normal to each distribution orifice with respect to the axis of rotation, is preferably identical to the angle formed by the normal to each diffusion orifice with respect to the axis of rotation;

each distribution orifice and each diffusion orifice extends in a plane which forms an angle that lies substantially between 20° and 60°, and is preferentially substantially equal to 45°, with the axis of rotation;

the first synchronization surface and the second synchronization surface are portions of spherical surfaces;

when the hydraulic distributor and the cylinder block are in an angular position in which a distribution orifice is facing a diffusion orifice, the end segment of the corresponding distribution duct and the end segment of the corresponding diffusion duct are aligned;

the external element comprises a tubular housing which bears the cam path and in which are mounted rolling bearings ensuring the revolving mounting with respect to one another of the internal element and of the external element;

one of said rolling bearings is substantially aligned axially with the synchronization junction;

the cylinder block comprises two flange rings disposed on either side of the cylinders, with a rolling bearing mounted between each flange ring and the external element;

one of said rolling bearings is substantially disposed in the direction in which each end segment of the distribution ducts extends;

the hydraulic distributor comprises rectilinear distribution ducts between a central chamber and the first synchronization surface;

the hydraulic distributor comprises distribution ducts between a peripheral chamber and the first synchronization surface, these distribution ducts comprising: a first rectilinear segment parallel to the axis of rotation and opening into the peripheral chamber; and said end segment which is oblique;

the diffusion ducts of the cylinder block are rectilinear between each cylinder and the second synchronization surface;

the external element comprises a distribution base inserted into the hydraulic distributor, the hydraulic distributor being axially movable on the distribution base and the hydraulic distributor being coupled in rotation with the distribution base;

the hydraulic distributor comprises two chambers delimited by an end circular seal and by a base circular seal disposed between the distribution base and the hydraulic distributor, the end circular seal having a lesser diameter than the base circular seal;

the hydraulic distributor is linked by a ball joint link to the distribution base;

the external element comprises, in a single piece, said tubular housing, said distribution base and a first cover linking the tubular housing to the distribution base;

the synchronization junction has an edge opening on one side in the external element and on the other side in an axial chamber of the internal element;

the internal element comprises a lubrication duct linking the axial chamber to a zone facing a seal to be lubricated secured to the external element.

BRIEF DESCRIPTION OF THE DRAWINGS

Other features and advantages of the disclosure will emerge from the following nonlimiting description, with reference to the attached drawings in which.

The elements that are similar and that are common to the various embodiments bear the same reference numbers in the figures.

DETAILED DESCRIPTION

Figure 1A:
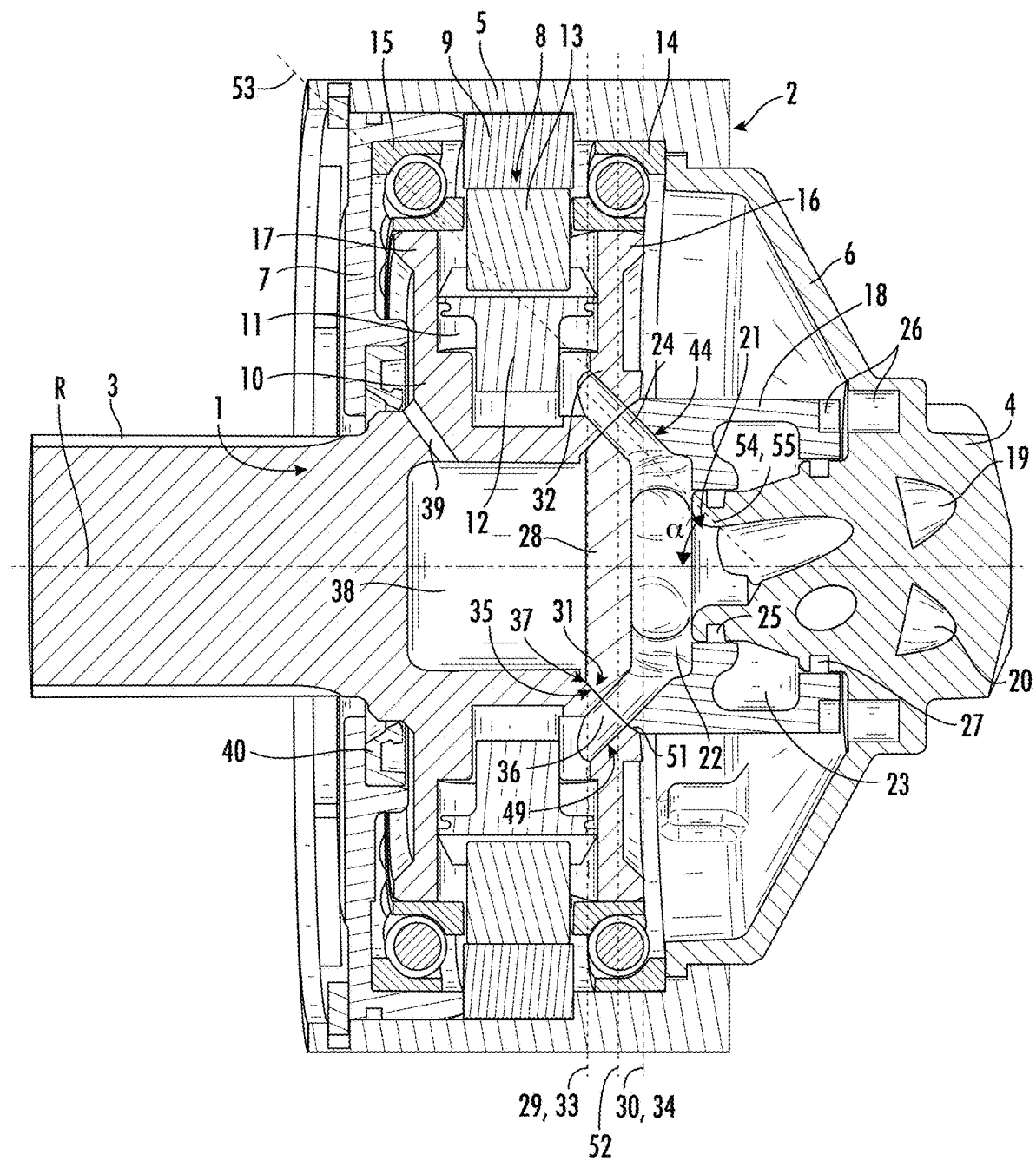
FIG. 1A is an axial cross-sectional view of a hydrostatic rotating machine according to the disclosure.
Figure 1B:
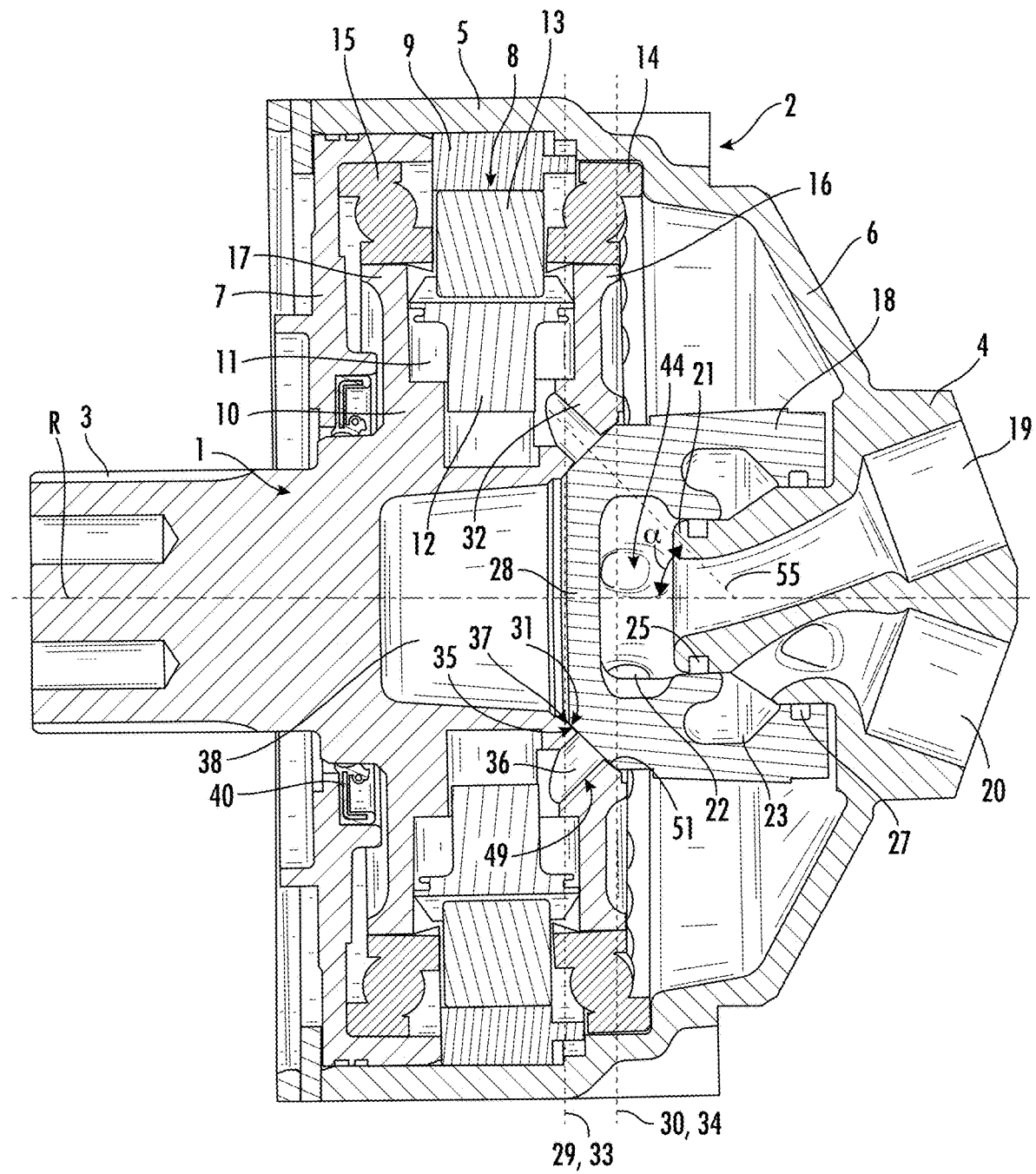
FIG. 1B is a view similar to FIG. 1A, for another angular position of the rotor with respect to the stator.

FIG. 1A illustrates a hydrostatic rotating machine according to the invention, seen in cross-section on a plane extending along its axis of rotation R. FIG. 1B illustrates the hydrostatic machine according to the same cross-section, for a different angular position of the rotor with respect to the stator.

This hydrostatic machine is either a hydraulic motor driving an element in rotation from a hydraulic fluid under pressure, or a hydraulic pump adapted to place a hydraulic fluid under pressure from the rotation of an element.

The hydrostatic rotating machine comprises an internal element 1 and an external element 2 which are mounted to revolve with respect to one another about the axis of rotation R by rolling bearings 14, 15.

In the present illustrative example, the hydrostatic machine is a hydraulic motor and the internal element 1 is secured to a driving element which is, here, composed of a splined shaft 3.

Out of the internal element 1 and the external element 2, one of these elements is a rotor while the other of these elements is a stator. In the present example, the external element 2 is a stator and is linked to a frame such as a structure fixed to or embedded on a vehicle, while the internal element 1 is a rotor and the splined shaft 3 is linked for example to a wheel or to a pinion.

The external element 2 comprises a housing 5, which here has a tubular form, with a first cover 6 which hermetically closes one of the openings (on the right side of FIG. 1A) of this tubular housing 5, and a second cover 7 which hermetically closes the opposite opening (on the left side of FIG. 1A).

The external element 2 is, in addition, secured to a cam path 8 that is characteristic of the hydrostatic machines with radial pistons. As is known, this cam path 8 is a circumferential form internal to the wall of the housing 5, with a course formed by hollows and bosses, constituting a cyclical course with a succession of increasing and decreasing radii synchronized with the intake and outlet movement of the radial pistons.

This cam path 8 can for example be machined directly on an inner face of the external element 2, for example machined directly on an inner face of the element 5. However, as illustrated in the figures, the present example preferably implements a cam path 8 borne by a cam ring 9 like that described in the patent of invention application WO2020008145. This cam ring 9 is inserted into the housing 5 of the external element 2, on an inner surface and is stopped in rotation by any means.

The internal element 1 comprises, for its part, a cylinder block 10 which is also specific to the hydrostatic machines with radial pistons. This cylinder block 10 is provided with cylinders 11 in which radially mobile pistons 12 are mounted.

As is known, the cylinders 11 are radial cylinders which extend over the entire circumference of the cylinder block 10, angularly distributed regularly about the axis of rotation R, and the pistons 12 each comprise, on their end turned towards the cam path 8, a roller 13 allowing rolling without slippage on the cam path 8.

The cam paths for a hydrostatic machine, the cooperation with the radial pistons, and the methods for synchronization by selective connection of the cylinders with the hydraulic fluid circuit, are moreover known and will not be described in more detail here.

The internal element 1 and the external element 2 are mounted to revolve with respect to one another by virtue, in this example, of a first rolling bearing 14 and a second rolling bearing 15 that are directly mounted between the internal element 1 and the external element 2. In addition to the cam ring 9, the tubular housing 5 bears these rolling bearings 14, 15. The example of the drawings illustrates two possible mountings of the rolling bearings 14, 15 in the housing 5: a direct mounting of the rolling bearing with its outer ring in contact with the housing 5 (this is the case of the first rolling bearing 14); and a mounting of the rolling bearing in the housing with an intermediate support ring (this is the case of the second rolling bearing 15), and, in the present example, this support ring forms part of the second cover 7.

The cylinder block 10 comprises two flange rings 16, 17 disposed on either side of the cylinders 11, with a rolling bearing 14, 15 mounted between each flange ring 16, 17 and the external element 2, the inner ring of each rolling bearing 14, 15 being directly mounted on the corresponding flange ring 16, 17.

A rolling bearing mounting that is simple and that generates reduced dimension chains is thus obtained, with the cam ring 9 mounted in the housing 5 and the rolling bearings 14, 15 disposed on either side of this cam ring 9 in forming the direct interface between the internal element 1 and the external element 2.

The hydrostatic machine additionally comprises hydraulic fluid distribution and synchronization means. These means comprise a hydraulic distributor 18 and a distribution base 4.

The distribution base 4 comprises a fluid inlet 19 and a fluid outlet 20 (partially visible in the cross-sectional view of FIG. 1A, and visible in FIG. 1B) which are coupled conventionally to the high-pressure and low-pressure portions of a hydraulic circuit. The hydrostatic machine also comprises a drain.

The distribution base 4 is secured to the external element 2. In this example, the distribution base 4 is secured to the first cover 6.

The hydraulic distributor 18 is mounted on the distribution base 4, by being axially mobile with respect thereto, the two parts being coupled in rotation. Recesses 26 are formed facing one another in the distribution base 4 and in the hydraulic distributor 18 and allow the rotational coupling using pins, while allowing axial sliding, and can also house springs to exert a pressure from the hydraulic distributor 18 against the internal element 1.

The hydraulic distributor 18 comprises a central chamber 22 and a peripheral chamber 23 each linked to fluid inlets 19 or fluid outlets 20. FIG. 1B illustrates the coupling of the chambers 22, 23 to the fluid inlets/outlets 19, 20 according to the present example.

Seals allow the hermetic partitioning of the chambers 22, 23, while allowing the axial movement of the hydraulic distributor 18 on the distribution base 4. These seals here comprise an end circular seal 25 and a base circular seal 27.

Figure 2:
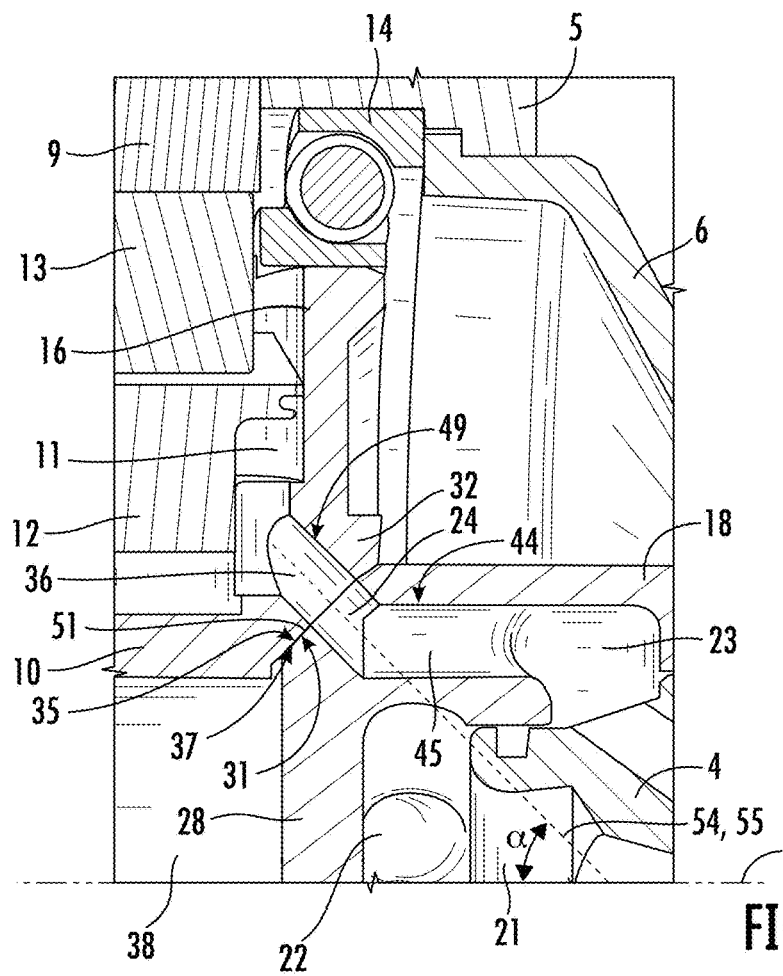
FIG. 2 is a detail view of an axial cross-section of the hydrostatic machine, showing the hydraulic distributor in another angular position.

FIG. 2 is a partial view of FIG. 1A, according to another angular position showing the coupling of the peripheral chamber 23 of the hydraulic distributor 18.

As is known, the two seals 25, 27 have different diameters in order to create an axial cylinder function for the hydraulic distributor 18. This axial cylinder function makes it possible to keep the hydraulic distributor 18 against the internal element 1, by opposing the forces generated in the implementation of the synchronization, that is to say the selective pressurizing of the cylinders 11. The distribution base 4 thus comprises an axial mouth 21 bearing the end circular seal 25 while the base circular seal 27 is disposed at the base of the distribution base 4. The diameter of the end circular seal 25 is less than the base circular seal 27 according to a proportion determining the force desired for the axial cylinder function.

The cylinder thus created by the hydraulic distributor 18 has the effect of countering the repulsion force exerted in the interface (the synchronization junction 37) between the hydraulic distributor 18 and the cylinder block 10.

The hydraulic distributor 18 additionally comprises an insertion section 28 which extends axially between a section of lesser diameter 29 and a section of greater diameter 30. In other words, the insertion section 28 is a slice of material which extends between a plane bearing the reference 29 in FIG. 1A, and a plane bearing the reference 30 in FIG. 1A.

Figure 3:
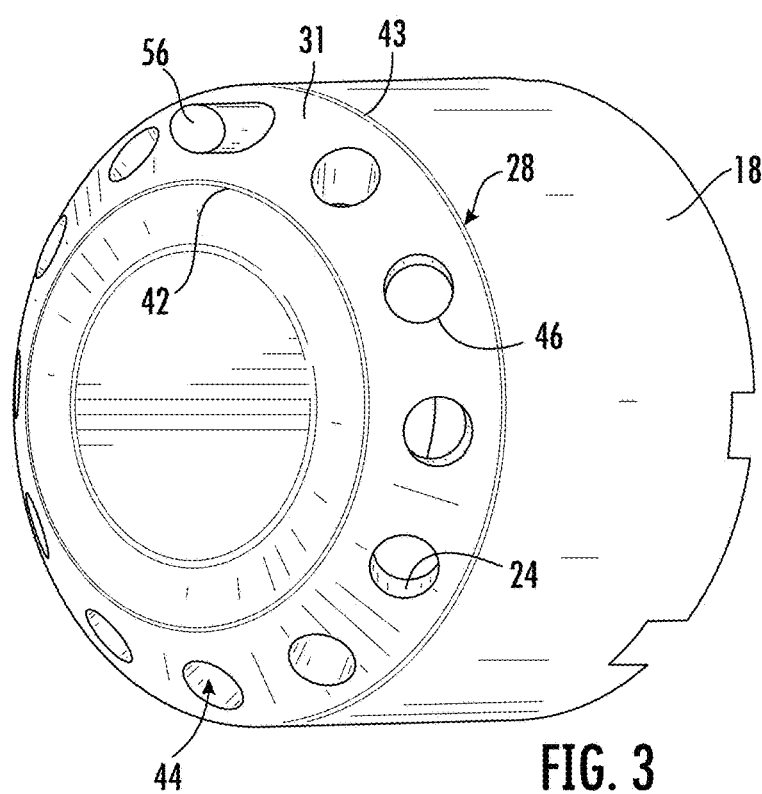
FIG. 3 is a perspective view of the hydraulic distributor of the hydrostatic machine.

FIG. 3 is a perspective view of the hydraulic distributor 18 alone. Since the hydraulic distributor 18 is a part of revolution, the two sections 29, 30 each define a circular form whose outline is a circle. The section of lesser diameter 29 thus has an outline 42 which is a circle, and the section of greater diameter 30 has an outline 43 which is a circle. The diameter of the outline 42 is thus less than the diameter of the outline 43.

The insertion section 28 of the hydraulic distributor 18 has a first synchronization surface 31 which extends obliquely between the outline 42 of the section of lesser diameter 29 and the outline 43 of the section of greater diameter 30. The first synchronization surface extends obliquely inasmuch as it extends in a way that is not parallel and not at right angles to the axis of rotation R.

In the present example, the first synchronization surface 31 is a spherical zone defined as the portion of the surface of a sphere passing through the two outlines 42, 43, and cut by the two sections 29, 30.

In the first illustrative example, the radius of this sphere is of the order of 4 cm.

The central chamber 22 and the peripheral chamber 23 are each linked to the first synchronization surface 31 by fluid distribution ducts 44 which each comprise an end segment 24 opening transversely at the first synchronization surface 31 and obliquely with respect to the axis of rotation R. In the present example, these end segments 24 form an angle α of between 20° and 60° with the axis of rotation R, and preferably 45° as illustrated. In other words, the longitudinal axis 54 of each end segment 24 cuts the axis of rotation R and forms with it the angle α (it is the internal angle which is considered here).

In the present example, more specifically, each end segment 24 opens in the second synchronization surface 35 by being substantially orthogonal to a plane tangential to this surface.

In the present example, the distribution ducts 44 which link the central chamber 22 to the first synchronization surface 31 are rectilinear. The end segment 24 of each is therefore in the extension of the rest of the distribution duct 44, and all of the distribution duct 44 forms an angle, which is 45° in this example, with the axis of rotation R.

The arrangement according to the invention makes it possible to obtain a link between the chambers 22, 23 of the hydraulic distributor 18 and the cylinders 11 which can be greatly shortened, and which contributes also to reducing the head losses.

In the present example also, the distribution ducts 44 which link the peripheral chamber 23 to the first synchronization surface 31 each comprise: a first segment 45 that is rectilinear and parallel to the axis of rotation R, this first segment opening into the peripheral chamber 23; and said end segment 24 which is oblique, with its angle of 45° in this example, with respect to the axis of rotation R.

Furthermore, the distribution ducts 44 each open through a distribution orifice 46 on the first synchronization surface 31 (see FIG. 3). These distribution orifices 46 are oriented on the first synchronization surface 31 such that the normal to each distribution orifice 46, which cuts the axis of rotation R, forms an angle that lies substantially between 20° and 60°, and is preferentially 45°, with respect to the axis of rotation R.

The first synchronization surface 31 is intended to cooperate with the internal element 1 in the context of the synchronization function aiming to selectively distribute the hydraulic fluid by exploiting the rotation of the rotor with respect to the stator. The cylinder block 10 cooperates here directly with the first synchronization surface 31, without requiring any interface through other components of the internal element 1.

The cylinder block 10 comprises, for its part, a reception section 32 which complements the insertion section 28 of the hydraulic distributor 18. The reception section 32 extends axially between a section of lesser diameter 33 and a section of greater diameter 34.

Figure 4:
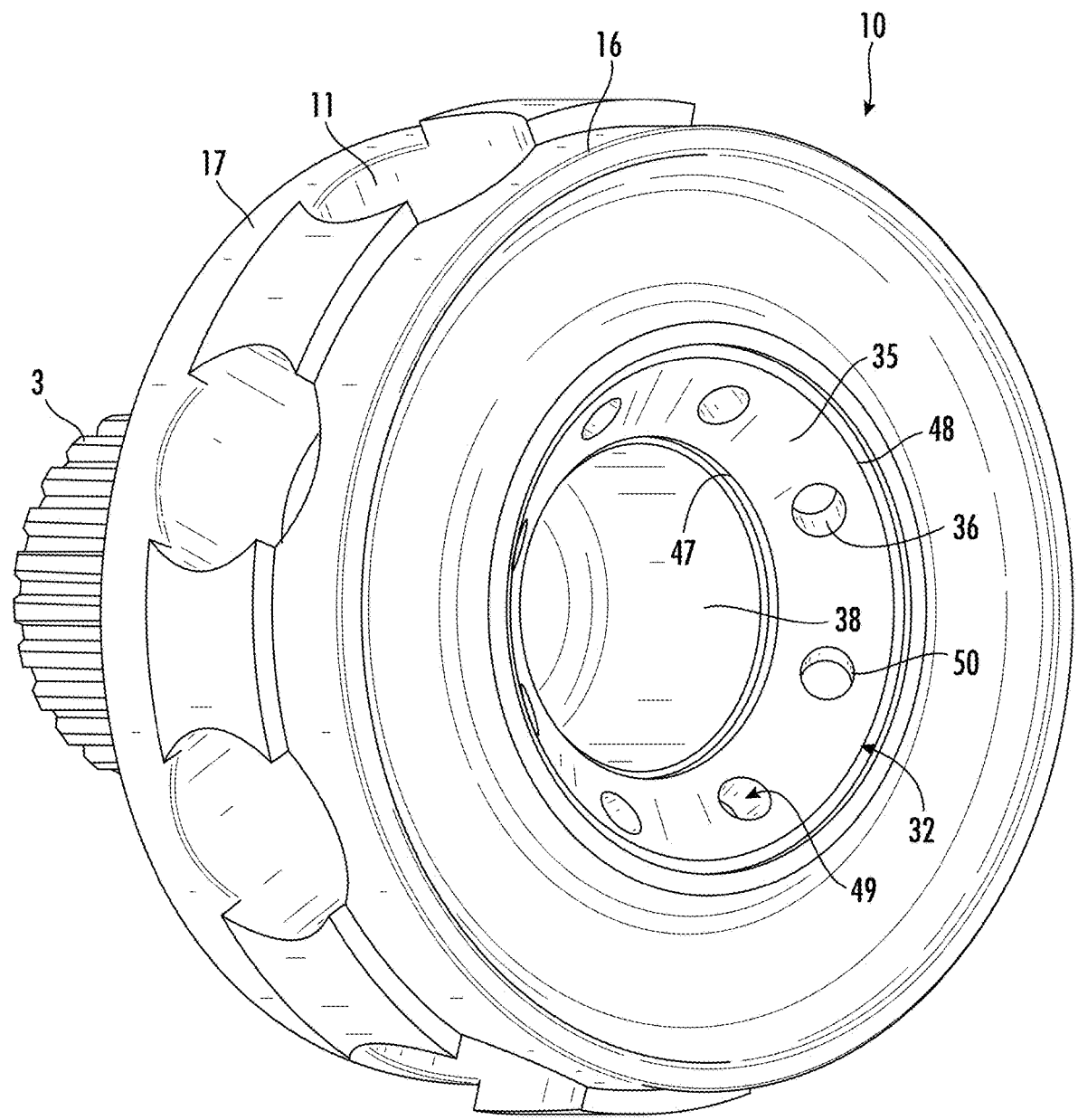
FIG. 4 is a perspective view of the cylinder block of the hydrostatic machine.

FIG. 4 is a perspective view of the cylinder block 10 alone. The section of lesser diameter 33 thus has a cavity with an outline 47 which is a circle, and the section of greater diameter 34 has a cavity with an outline 48 which is a circle. The diameter of the outline 47 is thus less than the diameter of the outline 48.

The reception section 32 of the cylinder block 10 has a second synchronization surface 35 which extends obliquely between the outline 47 and the outline 48 of the cavity of the cylinder block. The second synchronization surface 35 extends obliquely inasmuch as it extends in a way that is not parallel and not at right angles to the axis of rotation R.

The second synchronization surface 35 complements the first synchronization surface 31, and it therefore has, in this example, the form of a spherical zone, that is to say a portion of the surface of a sphere passing through the two outlines 47, 48, and cut by the two sections 33, 34.

Referring to FIGS. 1A and 1B, when the hydrostatic machine is in operating state, the first synchronization surface 31 is stressed towards the second synchronization surface 35, the association of these two synchronization surfaces 31, 35 forming a synchronization junction 37 in which the hydraulic fluid will be distributed selectively between two elements with a relative rotation.

The cylinder block 10 additionally comprises diffusion ducts 49 for the hydraulic fluid. These diffusion ducts 49 link the second synchronization surface 35 to the cylinders 11 for the exchange of fluid related to the movement of the pistons 12. The diffusion ducts 49 each comprise an end segment 36 opening transversely at the second synchronization surface 35 and obliquely with respect to the axis of rotation R. In the present example, these end segments 36 form an angle α that lies between 20° and 60° with the axis of rotation R, and is preferably 45° as illustrated. In other words, the longitudinal axis 55 of each end segment 36 cuts the axis of rotation R and forms with it the angle α (it is the internal angle which is considered here).

In the present example, more specifically, each end segment 36 opens in the second synchronization surface 35 by being substantially orthogonal to a plane tangential to this surface.

In the present example, the diffusion ducts 49 are rectilinear. The end segment 36 of each is therefore in the extension of the rest of the diffusion duct 49, and all of the diffusion duct 49 forms an angle, which is 45° in this example, with the axis of rotation R.

In addition, the diffusion ducts 49 each open through a diffusion orifice 50 on the second synchronization surface 35 (see FIG. 4). These diffusion orifices 50 are oriented on the second synchronization surface 35 such that the normal to each diffusion orifice 50, which cuts the axis of rotation R, forms an angle that lies substantially between 20° and 60°, and is preferentially 45°, with respect to the axis of rotation R.

Preferably, the angle formed by the normal to each distribution orifice 46 with respect to the axis of rotation R, is identical to the angle formed by the normal to each diffusion orifice 50 with respect to the axis of rotation R.

Preferably, each distribution orifice 46 and each diffusion orifice 50 extends in a plane which forms an angle that lies substantially between 20° and 60°, and is preferentially substantially equal to 45°, with the axis of rotation R.

Preferably, when a distribution orifice 46 is facing a diffusion orifice 50, the two end segments 24, 36 of the respective ducts 44, 49 are in the extension of one another and preferentially substantially coaxial. In other words, when the hydraulic distributor 18 and the cylinder block 10 are in an angular position in which a distribution orifice 46 is facing a diffusion orifice 50, the end segment 24 of the corresponding distribution duct 44 and the end segment 36 of the corresponding diffusion duct 49 are aligned.

As illustrated in FIGS. 1A and 1B, the presence of the reception section 32 directly on the cylinder block 10 allows the hydraulic distributor 18, via its insertion section 28, to come to be embedded directly in the cylinder block 10, as close as possible to the cylinders 11, which has the consequences of reducing and simplifying the routing of the ducts, and of reducing the axial bulk of the hydrostatic machine.

In the example illustrated in FIG. 1A, which is particularly advantageous, the central chamber 22 of the hydraulic distributor 18 is linked to a cylinder 11 (at the moment when the hydraulic distributor 18 is in the appropriate angular position) directly by a rectilinear duct (formed by a distribution duct 44 and a diffusion duct 49 that are aligned). This reduces the head losses consequentially since there is no bend in this flow.

Figure 5:
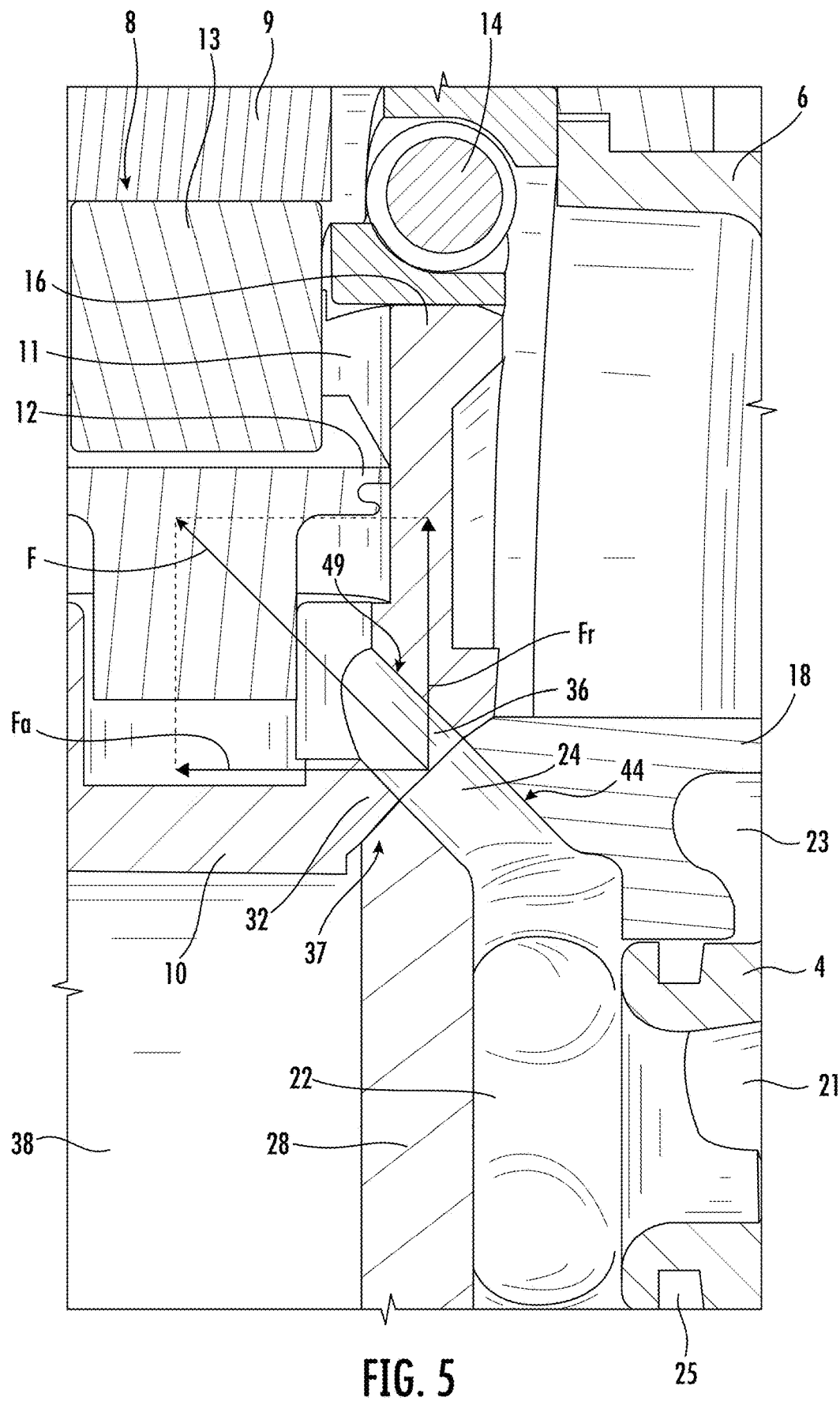
FIG. 5 is a schematic detail view of FIG. 1A.

FIG. 5 is a partial view of FIG. 1A theoretically illustrating the resulting forces which are exerted between the internal element 1 and the external element 2, at the high-pressure hydraulic circuit, for an angular position of the hydraulic distributor 18 in which a distribution duct 44 is in blocked position.

The force F represented is exerted by the hydraulic fluid on the cylinder block and has a tendency to distance the hydraulic distributor 18 and the cylinder block 10. This force is compensated by an opposite force created by the axial cylinder function described previously, to keep the distributor 18 against the cylinder block 10. Given its inclination with respect to the axis of rotation R, this force F has a radial component Fr and an axial component Fa.

Given the symmetry of the device, the radial components Fr of all the forces F being exerted at the synchronization junction 37 are opposed pairwise and therefore strain only the cylinder block 10. The radial components Fr are exerted therefore only on the material of the cylinder block 10. Thus, with a suitable dimensioning of the cylinder block 10, this radial component Fr is not transmitted to the rolling bearings 14, 15.

The rolling bearings 14, 15 axially undergo only the axial component Fa of the force F which is here reduced. In the present example, with the force F forming an angle of the order of 45° with the axis of rotation R (given the orientation of the distribution orifice 46 and of the ducts), the axial component Fa represents approximately two thirds of the total force F.

For example, for a hydraulic motor with a fluid pressure of the order of 400 bar, the force F is of the order of 35 kN and its axial component Fa is of the order of 25 kN. Applying the component Fa to the rolling bearings 14, 15 instead of the total force F is equivalent to a saving of the order of 30% of the force applied to the rolling bearings. Such a saving of axial forces applied to the rolling bearings is considerable, and makes it possible to reduce their dimensioning, even change technology, with corresponding savings in bulk and in cost.

Figure 6:
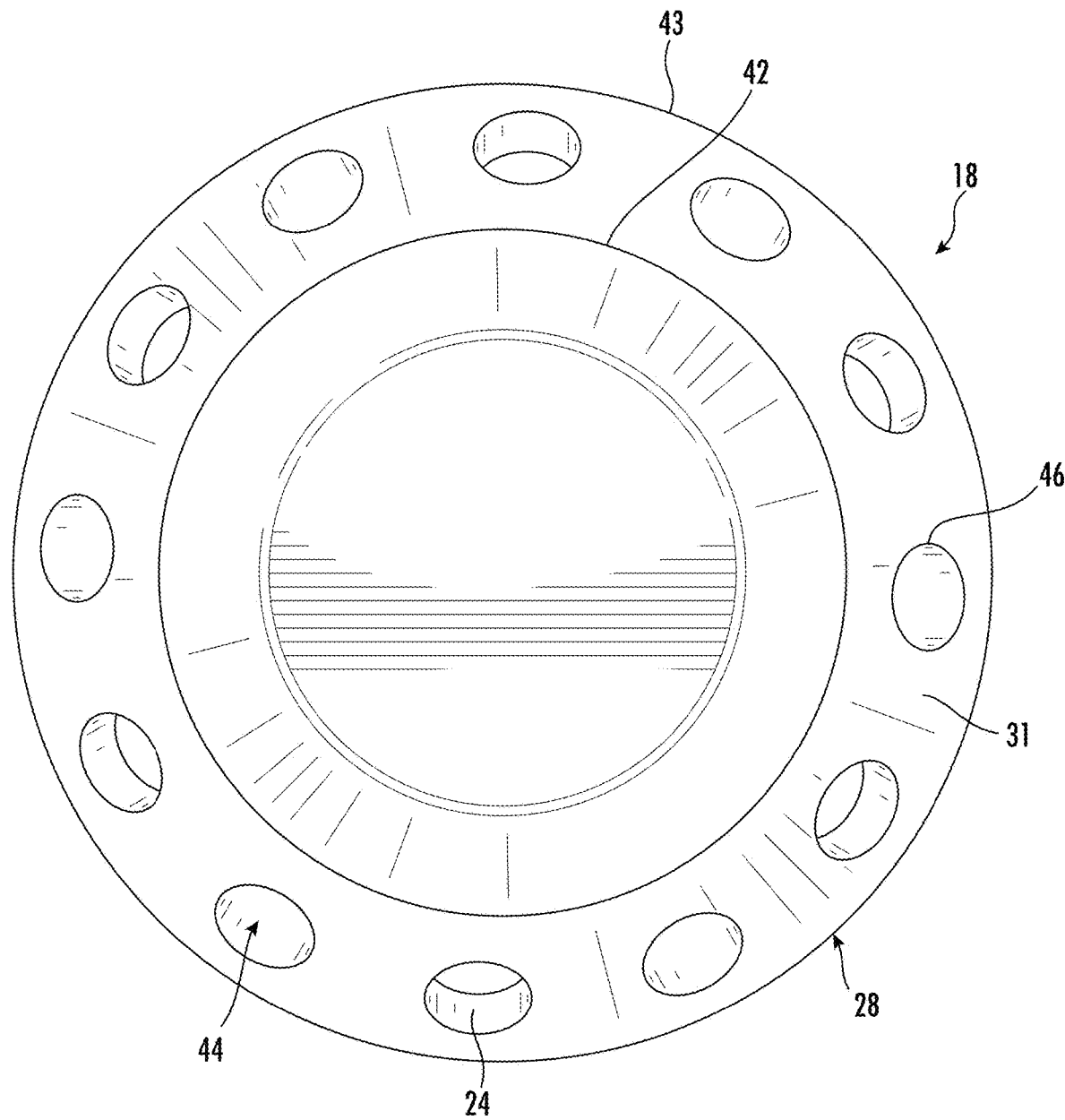
FIG. 6 is a front view of the hydraulic distributor of the hydrostatic machine.

FIG. 6 represents the hydraulic distributor 18 seen from the front, on the axis of rotation R. This figure visually illustrates the reduction of the fluid section seen along the axis of rotation R. The distribution orifices 46 are seen, along the axis of rotation R, as ellipses whose surface is reduced by approximately ⅓ with respect to the real surface of the distribution orifices 46. This projection of the ellipse is also schematically represented by the reference 56 in FIG. 3.

The rolling bearings 14, 15 can therefore be dimensioned smaller with respect to the prior art. Their technology can also be reviewed, with a choice of a technology less suited to the strong loads, but which here becomes suitable given the lowering of the axial load. Such is the case of the standard ball bearings with oblique contact of the example illustrated, which are additionally arranged according to an X mounting, which is less costly.

The reduction of the axial efforts here allows the use of two ball bearings with oblique contact, which are consequently designed to be identical and to have a suitable internal diameter, and to have a small width.

The arrangement of the synchronization junction 37 allows for very much smaller dimension chains. In the example illustrated in FIG. 1A, the housing 5 and the first cover 6 are mounted in one another with a precise fit, and are coaxial with low dispersion. In a variant, illustrated in FIG. 1B, this coaxiality can be enhanced further by producing the housing 5 and the first cover 6 in a single piece, for example by lathe work. Thus, the seating of the rolling bearings 14, 15, and the distribution base 4 (and therefore the seating of the circular seals 25, 27) are machined together by lathe work with the perfect coaxiality obtained at low cost.

The dimension chain around the synchronization junction 37 is thus very much reduced since it passes only through the hydraulic distributor 18, the distribution base 4, the rolling bearings 14, 15, and the cylinder block 10. These elements also obtain fits that are naturally effective in coaxiality, notably the mounting of the rolling bearings.

Within this aim to optimize the dimension chains, the positioning of the rolling bearings preferably has at least one of the following features:

one of the rolling bearings (here the first rolling bearing 14) is substantially aligned axially with the synchronization junction 37 (see axis 52 in FIG. 1A), in other words, the insertion section of the hydraulic distributor 18 is installed under the rolling bearing 14, and thus contributes to the effect of compactness; and/or one of the rolling bearings (here the second rolling bearing 15) is substantially disposed in the direction in which each end segment 24 of the distribution ducts 44 extends (see axis 53 in FIG. 1A).

Moreover, preferably, the hydraulic distributor 18 is linked by a ball joint link to the distribution base 4. However, given the arrangement according to the invention, a ball joint link of small amplitude is sufficient, and the circular seals 25, 27 are chosen to favour a good seal-tightness, while allowing a slight swivelling. Circular seals made of a material such as polyamide are thus appropriate.

In addition, the arrangement of the synchronization junction 37 of this example, with the form of complementary spherical surfaces of the first and second synchronization surfaces, guarantees a swivelling of the hydraulic distributor 18 which does not generate any strains in the assembly.

Moreover, the reduction of the axial force generated by the hydraulic fluid applies also to the cylinder function of the hydraulic distributor 18 which can thereby be also reduced by ⅓ in this example, further reducing the bulk, and the dimensioning of the parts.

Moreover, referring to FIGS. 1A and 1B, the synchronization junction 37 has an edge 51 opening on one side in the external element 2 and on the other side in the internal element 1, in an axial chamber 38.

The invention allows for a best fit dimensioning of this edge 51, large enough to contain any leak of hydraulic fluid, and small enough not to keep a significant pressure gradient. The invention makes it possible to dimension the edge 51 by dimensioning the insertion 28 and reception 32 sections. In the present example, the edge 51 has a length of 1 to 3 mm on either side of the distribution orifices 46 and of the diffusion orifices 50 (in the plane of FIG. 1A).

This arrangement makes it possible anyway to reduce the hydraulic leak path. The hydraulic fluid protruding at the edge 51 is rapidly admitted, on one side into the space enclosed by the first cover 6, and on the other side into the axial chamber 38 of the internal element 1. The proximity between the masses of hydraulic fluid which pass through the cylinders 11 and which closely encircle the synchronization junction 37 improves the thermal stability of the assembly by avoiding the formation of hot spots at the synchronization junction 37.

The axial chamber 38 is produced by a machining that is concentric to the cylinder block 10 and is centred on the axis of rotation R. The internal element 1 can, in addition, comprise a lubrication duct 39 allowing the hydraulic fluid to exit from the axial chamber 38, under the effect of its continued supply by the leak at the edge 51. Advantageously, the lubrication duct 39 opens facing a lip seal 40 which ensures the seal-tightness between the second cover 7 and the internal element 1. This disposition allows for a continuous sprinkling of the lip seal 40 by a jet of hydraulic fluid at the flow rate corresponding to the flow rate of the entry of the hydraulic fluid into the axial chamber 38, and in a revolving manner by virtue of the rotational movement of the output from the lubrication duct 39 with respect to the lip seal 40, and this with a fluid that has cooled in the axial chamber 38. This improves the seal-tightness function of the seal and its lifetime.

Variant embodiments can be envisaged. For example, the synchronization surfaces 31, 35 can have other forms adapted to extend obliquely, for example forms extending obliquely in directions opposite to the present example, conical forms or any suitable form.

The invention claimed is:

1. A hydrostatic rotating machine comprising:

an external element comprising a circumferential internal cam path; and an internal element comprising a cylinder block, the internal and external elements being coaxial and mounted to revolve with respect to one another about an axis of rotation, one of the internal and external elements being a rotor and the other of the internal and external elements being a stator, the cylinder block including radial cylinders with pistons that are radially mobile and distributed circumferentially, and the cylinder block being disposed at a center of the cam path and the pistons being configured to cooperate with the cam path in the rotation of the rotor with respect to the stator; and a hydraulic distributor configured to selectively couple the cylinders to a hydraulic circuit via a synchronization junction forming a revolving coupling between the rotor and the stator, the hydraulic distributor comprising:

an insertion section extending axially between a section of lesser diameter and a section of greater diameter, this insertion section having a first synchronization surface extending between the outline of the section of lesser diameter and the outline of the section of greater diameter; and fluid distribution ducts which each comprise a first end segment opening transversely at the first synchronization surface, and obliquely with respect to the axis of rotation, wherein the cylinder block further comprises:

a reception section complementing the insertion section of the hydraulic distributor, the reception section having a second synchronization surface complementing the first synchronization surface of the hydraulic distributor, said synchronization junction being formed via association of the first synchronization surface and of the second synchronization surface; and fluid diffusion ducts, each of which comprises a second end segment opening (i) transversely at the second synchronization surface and (ii) obliquely with respect to the axis of rotation.

2. The hydrostatic rotating machine according to claim 1, wherein the first end segments of the distribution ducts form an angle that lies substantially between 20° and 60° with respect to the axis of rotation.

3. The hydrostatic rotating machine according to claim 1, wherein the second end segments of the diffusion ducts form an angle that lies substantially between 20° and 60° with respect to the axis of rotation.

4. The hydrostatic rotating machine according to claim 1, wherein:
- the distribution ducts each open through a distribution orifice on the first synchronization surface, a normal to each distribution orifice forming a first angle that lies substantially between 20° and 60° with respect to the axis of rotation; and
- the diffusion ducts each open through diffusion orifices on the second synchronization surface, a normal to each diffusion orifice forming a second angle that lies substantially between 20° and 60° with respect to the axis of rotation.

5. The hydrostatic rotating machine according to claim 4, wherein the first angle is identical to the second angle.

6. The hydrostatic rotating machine according to claim 4, wherein each distribution orifice and each diffusion orifice extends in a plane which forms a respective angle that lies substantially between 20° and 60° with the axis of rotation.

7. The hydrostatic rotating machine according to claim 1, wherein the first synchronization surface and the second synchronization surface are portions of spherical surfaces.

8. The hydrostatic rotating machine according to claim 4, wherein, when the hydraulic distributor and the cylinder block are in an angular position in which a distribution orifice is facing a diffusion orifice, the first end segment of the corresponding distribution duct and the second end segment of the corresponding diffusion duct are aligned.

9. The hydrostatic rotating machine according to claim 1, wherein the external element comprises a tubular housing which defines the cam path and in which are mounted rolling bearings configured to enable the revolving mounting with respect to one another of the internal element and of the external element.

10. The hydrostatic rotating machine according to claim 9, wherein one of said rolling bearings is substantially aligned axially with the synchronization junction.

11. The hydrostatic rotating machine according to claim 10, wherein the cylinder block further comprises two flange rings disposed on either side of the cylinders, and a rolling bearing is mounted between each flange ring and the external element.

12. The hydrostatic rotating machine according to claim 11, wherein one of said rolling bearings is substantially disposed in the direction in which each first end segment of the distribution ducts extends.

13. The hydrostatic rotating machine according to claim 1, wherein the fluid distribution ducts include rectilinear distribution ducts between a central chamber and the first synchronization surface.

14. The hydrostatic rotating machine according to claim 1, wherein the fluid distribution ducts include first distribution ducts between a peripheral chamber and the first synchronization surface, the first distribution ducts comprising a first rectilinear segment parallel to the axis of rotation and opening into the peripheral chamber, and said first end segment which is oblique.

15. The hydrostatic rotating machine according to claim 1, wherein the diffusion ducts of the cylinder block are rectilinear between each cylinder and the second synchronization surface.

16. The hydrostatic rotating machine according to claim 1, wherein:
- the external element comprises a distribution base inserted into the hydraulic distributor, the hydraulic distributor being axially movable on the distribution base and the hydraulic distributor being coupled in rotation with the distribution base; and
- the hydraulic distributor comprises two chambers delimited by an end circular seal and by a base circular seal disposed between the distribution base and the hydraulic distributor, the end circular seal having a lesser diameter than the base circular seal.

17. The hydrostatic rotating machine according to claim 16, wherein the hydraulic distributor is linked to the distribution base by a ball joint link.

18. The hydrostatic rotating machine according to claim 16, wherein:
- the external element comprises a tubular housing which defines the cam path and in which are mounted rolling bearings configured to enable the revolving mounting with respect to one another of the internal element and of the external element; and
- the external element comprises, in a single piece, said tubular housing, said distribution base, and a first cover linking the tubular housing to the distribution base.

19. The hydrostatic rotating machine according to claim 1, wherein the synchronization junction has an edge that opens on one side in the external element and on the other side in an axial chamber of the internal element.

20. The hydrostatic rotating machine according to claim 19, wherein the internal element comprises a lubrication duct linking the axial chamber to a zone facing a seal to be lubricated secured to the external element.

* * * * *